US010436525B2

(12) United States Patent
Oluwaseun et al.

(10) Patent No.: US 10,436,525 B2
(45) Date of Patent: Oct. 8, 2019

(54) CYCLONIC COOLING SYSTEM

(71) Applicant: GOLDEN RENEWABLE ENERGY, Yonkers, NY (US)

(72) Inventors: Oluwadare Oluwaseun, Yonkers, NY (US); David W. Fowler, Yonkers, NY (US); Anthony F. Tenore, Yonkers, NY (US)

(73) Assignee: Golden Renewable Energy, LLC, Yonkers, NY (US)

( * ) Notice: Subject to any disclaimer, the term of this patent is extended or adjusted under 35 U.S.C. 154(b) by 1 day.

(21) Appl. No.: 15/054,903

(22) Filed: May 12, 2016

(65) Prior Publication Data

US 2018/0031334 A1 Feb. 1, 2018

(51) Int. Cl.
*F28F 5/02* (2006.01)
*F28F 9/12* (2006.01)
(Continued)

(52) U.S. Cl.
CPC .............. *F28F 1/40* (2013.01); *B01D 5/00* (2013.01); *B01D 5/0006* (2013.01);
(Continued)

(58) Field of Classification Search
CPC ........ F28D 7/0058; F28D 7/02; F28D 7/1615; F28D 2021/0075; F28D 1/00;
(Continued)

(56) References Cited

U.S. PATENT DOCUMENTS 836,701 A 11/1906 Oliver
2,400,075 A * 5/1946 Claussen ................. B01J 23/94
208/120.15
(Continued)

FOREIGN PATENT DOCUMENTS

CN 105542830 A 5/2016
DE 1769235 A1 * 10/1971 ............. B01D 53/04
(Continued)

OTHER PUBLICATIONS

U.S. Office Action dated May 3, 2018 in U.S. Appl. No. 15/062,319.
(Continued)

*Primary Examiner* — Keith M Raymond
*Assistant Examiner* — Gustavo A Hincapie Serna
(74) *Attorney, Agent, or Firm* — Ajay A. Jagtiani; Miles & Stockbridge P.C.

(57) ABSTRACT

Fractionation, the process used by refineries to break down carbon chains of petroleum compounds so that the desired carbon compound can be achieved. This process typically involves high heat, distillation, re-boiling, and energy intensive cooling processes. This application discloses an invention that will condense vapor produced by a pyrolysis reactor. This system uses one standard cyclone; three cascading cyclones with internal cyclonic rotation fins that force incoming vapor to maintain a fixed amount of rotation regardless of the vapor's velocity, heat sinks that increase condensation, reversing fins that force gases to reverse direction inside the cyclone decreasing vapor velocity to increase heat loss; a main collection tank that allows for the controlling of the fuel flash point; a compact low temperature coil cooler that uses 100 percent of the cooling surface that allows for the production of higher quality fuel; and, bubblers/scrubbers that produce back pressure into the pyrolysis reactor.

4 Claims, 7 Drawing Sheets

(51) Int. Cl.
  *F23J 15/06*    (2006.01)
  *F28D 7/02*    (2006.01)
  *C10G 1/10*    (2006.01)
  *C10G 70/04*    (2006.01)
  *B01D 5/00*    (2006.01)
  *C10G 9/00*    (2006.01)
  *F28D 1/00*    (2006.01)
  *F28D 7/00*    (2006.01)
  *F28D 7/16*    (2006.01)
  *F28F 1/40*    (2006.01)
  *B01D 53/00*    (2006.01)
  *F23J 15/02*    (2006.01)
  *F28F 13/06*    (2006.01)
  *F28D 21/00*    (2006.01)

(52) U.S. Cl.
  CPC ......... *B01D 5/0081* (2013.01); *B01D 53/002* (2013.01); *C10G 1/10* (2013.01); *C10G 9/002* (2013.01); *C10G 70/04* (2013.01); *F23J 15/027* (2013.01); *F23J 15/06* (2013.01); *F28D 1/00* (2013.01); *F28D 7/0058* (2013.01); *F28D 7/024* (2013.01); *F28D 7/026* (2013.01); *F28D 7/1684* (2013.01); *F28F 5/02* (2013.01); *F28F 13/06* (2013.01); *F23J 2219/70* (2013.01); *F28D 7/02* (2013.01); *F28D 7/1615* (2013.01); *F28D 2021/0075* (2013.01); *F28F 9/12* (2013.01); *F28F 2275/06* (2013.01); *Y02E 20/363* (2013.01)

(58) Field of Classification Search
  CPC ........ F28D 7/024; F28D 7/026; F28D 7/1684; F28F 1/40; F28F 5/00; F28F 5/02; F28F 9/12; F28F 13/06; F23J 15/00; F23J 15/027; F23J 15/06; F23J 2219/00; F23J 2219/70; B01D 53/00; B01D 23/002; B01D 5/00; B01D 5/0006; B01D 5/0081; C10K 1/00; C10G 1/10; C10G 9/002; C10G 70/04
  USPC .......... 165/177, 179; 201/10, 12, 20, 21, 22, 201/23, 24, 27, 29, 31
  See application file for complete search history.

(56) References Cited

U.S. PATENT DOCUMENTS

| | | | | |
|---|---|---|---|---|
| 2,413,238 | A * | 12/1946 | Liptak | C10G 5/04 261/8 |
| 2,458,068 | A | 1/1949 | Fuller | |
| 2,616,519 | A | 11/1952 | Crankshaw et al. | |
| 2,916,121 | A | 8/1953 | Lips et al. | |
| 2,908,653 | A * | 10/1959 | Hengstebeck | B01J 23/96 208/140 |
| 3,006,438 | A * | 10/1961 | De Yarmett | B01D 53/0462 95/120 |
| 3,129,459 | A | 4/1964 | Kullgren et al. | |
| 3,151,784 | A | 10/1964 | Tailor | |
| 3,168,136 | A | 2/1965 | Ammon | |
| 3,258,068 | A | 6/1966 | Hollister | |
| 3,455,789 | A * | 7/1969 | Landers | C10B 49/08 201/31 |
| 3,458,321 | A | 7/1969 | Reinhart et al. | |
| 3,655,518 | A * | 4/1972 | Schmalfeld | C10B 49/20 201/12 |
| 3,797,702 | A | 3/1974 | Robertson | |
| 3,822,866 | A | 7/1974 | Daester et al. | |
| 3,907,259 | A | 9/1975 | Leclercq | |
| 3,962,043 | A * | 6/1976 | Schmalfeld | C10B 49/16 201/21 |
| 3,981,454 | A | 9/1976 | Williams | |
| 4,025,058 | A | 5/1977 | Mizuguchi | |
| 4,060,127 | A | 11/1977 | Savin et al. | |
| 4,123,332 | A | 10/1978 | Rotter | |
| 4,153,514 | A * | 5/1979 | Garrett | C10B 49/08 201/12 |
| 4,208,250 | A * | 6/1980 | Babanin | C10B 49/08 201/10 |
| 4,261,225 | A | 4/1981 | Zahradnik | |
| 4,322,222 | A * | 3/1982 | Sass | C10J 1/207 201/12 |
| 4,426,018 | A | 1/1984 | Ward | |
| 4,437,046 | A | 3/1984 | Faillace | |
| 4,473,478 | A * | 9/1984 | Chivrall | B01D 19/0057 209/727 |
| 4,500,481 | A | 2/1985 | Marx, III | |
| 4,529,579 | A | 7/1985 | Raahauge | |
| 4,640,203 | A | 2/1987 | Wolter et al. | |
| 4,842,126 | A | 6/1989 | McConnell | |
| 4,858,681 | A | 8/1989 | Sulzberger | |
| 5,032,143 | A | 7/1991 | Ritakallio | |
| 5,078,857 | A | 1/1992 | Melton | |
| 5,129,995 | A | 7/1992 | Agarwal | |
| 5,174,479 | A | 12/1992 | Dufour | |
| 5,205,225 | A | 4/1993 | Milsap, III | |
| 5,394,937 | A | 3/1995 | Nieh | |
| 5,611,268 | A | 3/1997 | Hamilton | |
| 5,720,232 | A | 2/1998 | Meador | |
| 5,732,829 | A | 3/1998 | Smith | |
| 5,756,871 | A | 5/1998 | Wang | |
| 5,762,666 | A | 6/1998 | Amrein et al. | |
| 5,993,751 | A | 11/1999 | Moriarty et al. | |
| 6,063,355 | A * | 5/2000 | Fujimura | C10J 3/54 252/373 |
| 6,109,902 | A | 8/2000 | Goris et al. | |
| 6,126,907 | A | 10/2000 | Wada | |
| 6,221,329 | B1 | 4/2001 | Faulkner et al. | |
| 6,270,630 | B1 | 8/2001 | Xing | |
| 6,276,286 | B1 | 8/2001 | Williams et al. | |
| 6,298,751 | B1 | 10/2001 | Ide et al. | |
| 6,387,221 | B1 | 5/2002 | Schoenhard | |
| 6,455,789 | B1 | 9/2002 | Allison | |
| 6,634,508 | B1 | 10/2003 | Ishigaki | |
| 6,758,150 | B2 | 7/2004 | Ballantine et al. | |
| 7,144,558 | B2 | 12/2006 | Smith | |
| 7,301,060 | B2 | 11/2007 | Appel et al. | |
| 7,311,509 | B2 | 12/2007 | Lupke | |
| 7,476,296 | B2 | 1/2009 | Appel et al. | |
| 7,692,050 | B2 | 4/2010 | Adams et al. | |
| 7,771,699 | B2 | 8/2010 | Adams et al. | |
| 7,905,990 | B2 * | 3/2011 | Freel | C10B 49/22 201/12 |
| 7,906,695 | B2 | 3/2011 | Giercke | |
| 8,003,833 | B2 | 8/2011 | Appel et al. | |
| 8,192,647 | B2 * | 6/2012 | Chornet | C10J 3/463 252/373 |
| 8,200,238 | B2 | 6/2012 | Gildea | |
| 8,215,477 | B2 | 7/2012 | Basaglia et al. | |
| 8,304,590 | B2 | 11/2012 | Hopkins et al. | |
| 8,365,812 | B2 | 2/2013 | Al-Hadhrami | |
| 8,372,248 | B1 | 2/2013 | Sherry | |
| 8,518,218 | B2 | 8/2013 | Ali et al. | |
| 8,548,501 | B2 | 10/2013 | Gildea | |
| 8,574,325 | B2 | 11/2013 | Jensen et al. | |
| 8,801,904 | B2 | 8/2014 | Miller et al. | |
| 8,809,606 | B2 | 8/2014 | Appel et al. | |
| 8,877,992 | B2 | 11/2014 | Appel et al. | |
| 9,045,693 | B2 | 6/2015 | Wolfe | |
| 9,052,109 | B1 | 6/2015 | Fowler | |
| 9,220,798 | B2 | 12/2015 | McKee et al. | |
| 9,275,655 | B2 | 3/2016 | Wilson et al. | |
| 9,624,439 | B2 | 4/2017 | Bakaya et al. | |
| 9,630,345 | B2 | 4/2017 | Alsewailern | |
| 9,795,940 | B2 | 10/2017 | Miller et al. | |
| 9,868,597 | B2 | 1/2018 | Henry et al. | |
| 9,896,625 | B2 * | 2/2018 | Young | C10G 1/10 |
| 2002/0048523 | A1 | 4/2002 | Achtelik et al. | |
| 2003/0047437 | A1 | 3/2003 | Stankevitch | |
| 2003/0098227 | A1 | 5/2003 | Okamoto et al. | |

(56) References Cited

U.S. PATENT DOCUMENTS

| | | |
|---|---|---|
| 2004/0003481 A1 | 1/2004 | Tarrant |
| 2004/0144698 A1 | 7/2004 | Hilpert et al. |
| 2006/0211899 A1 | 9/2006 | Lee |
| 2007/0179326 A1* | 8/2007 | Baker .................... C10B 47/18 585/241 |
| 2007/0193408 A1 | 8/2007 | Martinez |
| 2008/0038071 A1 | 2/2008 | Bodie et al. |
| 2008/0105141 A1 | 5/2008 | Duperon |
| 2008/0128259 A1* | 6/2008 | Kostek ................ B01D 5/0006 201/4 |
| 2008/0202983 A1 | 8/2008 | Smith |
| 2008/0286557 A1 | 11/2008 | Tucker |
| 2010/0008836 A1 | 1/2010 | Pecci |
| 2010/0024696 A1 | 2/2010 | Cauley et al. |
| 2010/0200229 A1 | 8/2010 | Jefferd |
| 2010/0289175 A1 | 11/2010 | Feichtinger et al. |
| 2010/0322843 A1* | 12/2010 | Court .................... B01D 53/38 423/437.1 |
| 2011/0290057 A1 | 12/2011 | Corcoran |
| 2012/0024106 A1 | 2/2012 | Brotzki |
| 2012/0024687 A1 | 2/2012 | Bratina et al. |
| 2012/0261247 A1 | 10/2012 | McNamara et al. |
| 2013/0299333 A1 | 11/2013 | Tucker et al. |
| 2014/0054815 A1 | 2/2014 | Houk et al. |
| 2014/0121426 A1 | 5/2014 | Tandon |
| 2014/0332363 A1 | 11/2014 | McGolden |
| 2015/0023826 A1 | 1/2015 | Desiron |
| 2015/0053542 A1 | 2/2015 | Liang |
| 2015/0064297 A1 | 3/2015 | Yang |
| 2015/0073181 A1 | 3/2015 | Gorke et al. |
| 2015/0080624 A1 | 3/2015 | Gephart et al. |
| 2015/0166911 A1 | 6/2015 | Reed |
| 2015/0259603 A1 | 9/2015 | Hallowell et al. |
| 2016/0068771 A1 | 3/2016 | Appel et al. |
| 2016/0258690 A1* | 9/2016 | Ladkat .................... F28D 7/16 |
| 2017/0036378 A1 | 2/2017 | Yanev et al. |
| 2017/0218278 A1 | 8/2017 | Bakaya et al. |
| 2017/0283707 A1 | 10/2017 | Gephart et al. |
| 2017/0361329 A1 | 12/2017 | Behrens et al. |
| 2017/0361558 A1 | 12/2017 | Tenore et al. |
| 2018/0056262 A1 | 3/2018 | Miller et al. |

FOREIGN PATENT DOCUMENTS

| | | |
|---|---|---|
| KR | 10-2003-0051913 B1 | 7/2003 |
| KR | 20030051913 | 7/2003 |
| KR | 20030051913 B1 | 7/2003 |
| KR | 10-0686370 | 2/2007 |
| KR | 100686370 B1 | 2/2007 |
| KR | 1020090117377 A | 11/2009 |
| SU | 509433 A1 | 5/1976 |
| WO | 01/05910 A1 | 1/2001 |
| WO | 0105910 A1 | 1/2001 |
| WO | 2008017953 A2 | 2/2008 |
| WO | 2009129233 A2 | 10/2009 |

OTHER PUBLICATIONS

U.S. Office Action dated Jun. 6, 2018 in U.S. Appl. No. 15/641,471.

Office Action received in U.S. Appl. No. 15/641,471 dated Feb. 12, 2018.

Office Action received in U.S. Appl. No. 15/062,319 dated Feb. 2, 2018.

Search Report and Written Opinion received in PCT Application No. PCT/IB2017/053713 dated Sep. 20, 2017.

Search Report and Written Opinion received in PCT Application No. PCT/IB2017/053714 dated Sep. 20, 2017.

Search Report and Written Opinion received in PCT Application No. PCT/IB2017/052811 dated Aug. 7, 2017.

Search Report and Written Opinion received in PCT Application No. PCT/IB2017/053667 dated Sep. 12, 2017.

Search Report and Written Opinion received in PCT Application No. PCT/IB2017/054058 dated Nov. 9, 2017.

Non-Final Office Action in corresponding U.S. Appl. No. 15/477,312 dated Sep. 17, 2016.

Non-Final Office Action in corresponding U.S. Appl. No. 15/054,903 dated Oct. 3, 2018.

Non-Final Office Action in corresponding U.S. Appl. No. 15/593,579 dated Oct. 3, 2018.

Non-Final Office Action in corresponding U.S. Appl. No. 15/641,471 dated Oct. 25, 2018.

Office Action received in U.S. Appl. No. 15/641,471 dated Apr. 1, 2019.

Office Action received in U.S. Appl. No. 15/628,844 dated Feb. 26, 2019.

Office Action received in U.S. Appl. No. 15/628,922 dated Apr. 29, 2019.

Office Action received in U.S. Appl. No. 16/263,088 dated May 8, 2019.

* cited by examiner

CYCLONIC COOLING SYSTEM

REFERENCE TO RELATED APPLICATIONS

This application discloses material that is related to material disclosed in a provisional application filed on Dec. 9, 2014, and having serial number 62089628, titled "Cyclonic Condensation System", incorporated herein in its entirety by reference.

BACKGROUND OF THE INVENTION

(a) Field of the Invention

The present invention improves on heat exchanged technology as it does not require the bolting of the heat exchangers from end to end; takes up much less space than if the current technology was used; increases the surface area inside of the condensers that make up a heat exchanger; requires much lower velocity of the vapor when entering the condenser; allows for the continued release of the condensed liquid after the heat exchange and reaction, allowing the non-condensed vapors to move to the next condenser, and; prevents the build-up of char that could plug the tubes within the condensers.

(b) Discussion of Known Art

The use of heat exchangers as cooling systems is known. Examples of known devices include U.S. Pat. No. 4,858,681 to Sclzberger, U.S. Pat. No. 8,365,812 to Al-Hadhrami, U.S. Pat. No. 4,060,127 to Savin et. al., U.S. Pat. No. 3,168,136 to Ammon, and U.S. Pat. No. 3,258,068 to Hollister. These patents teach multi-stage heat exchangers to slowly cool a vapor. These patents use condensers that are bolted end to end on a slope so any liquid accumulating as a result of vapor condensation will flow down a slope or gradient. The problem with these designs is the amount of space required for these types of set-ups and the low surface area inside the condensers. These designs also do not allow for the daisy-chain design utilized in this invention so that the condensation of usable re-useable fuel vapors in optimized. This invention's Cyclonic Cooling System is part of a re-useable energy technology and the prior art designs would lead to Char build-up and plugging of the tubes within the condenser reducing effectiveness.

The invention discussed herein differs from the prior art as it employs modified rotation fins, internal cyclone heat sinks, forced gas direction reversal inside of each cyclone, the ability to control fuel flash points without an external heat source, separation of the collected fuels without an external heat source, and compact low temperature coil cooler that uses one hundred percent of the cooling surface.

SUMMARY

The Cyclonic Cooling System consists of four cyclones, two fuel tanks, an air cooled radiator, one glycol chilled coil condenser, two bubblers, and one expansion tank all attached to a structural steel frame. The cyclones are constructed from 10 gauge stainless steel material. This material was selected due to its ability to withstand the internal pressure of the reactor while allowing heat to pass through the metal, cooling the incoming gas. The cyclones consist of a scrolled inlet, flanged body section, internal tube with fixed rotation fins, an interior baffle with reversed rotation fins, a bolted cone with support pads, and a discharge hopper with an outlet port. The internal rotation fins are welded to one side of the cyclone tube allowing for the condensed liquid to run through the fins to the discharge hopper. The internal tube also has a cone bottom to continue the vapor to pressurize inside the cyclone. Inside the internal tube is a cone drum that acts as a baffle. This baffle also has rotation fins welded to one side. The cone drum baffle has a sloped top to allow for drainage of any condensation that may occur inside. The gas inlet and outlet discharge ports have a flange connection. The cone bottom is equipped with a coupling that acts as a level indicator. The cone bottom has a discharge part with a stub in flange for rotation and connection to the discharge hopper. The discharge hopper has a drain port, two outlet ports and the level indicator coupling. The cyclones are piped in a daisy chain configuration. The piping used between cyclones is a thin wall schedule 10 stainless steel pipe with ANSI 150 flanges. This pipe is sloped from one cyclone to the next and downhill to drain any condensation vapors. The last cyclone in the daisy chain has an air cooled heat exchanger connected to the top discharge flange. This air cooled heat exchanger reduces the remaining vapor temperature and allows for liquid to condense and return to the last cyclone where it enters the discharge hopper. This air cooled heat exchanger is constructed from oval-shaped tubing. The oval-shaped tubing is welded to the top and bottom seal plate, openings in the seal plate are welded to the oval-shaped tubing to allow vapors to pass through the inside of the tubing. Housing surrounds the tubing section and connects to an inlet chamber and gas discharge chamber. The fan is connected to the tube section housing. This part of the system uses ambient air and forces it across the outside of the tubing to reduce the inside vapor temperature.

The fuel tanks are constructed from heavy wall schedule 40 stainless steel pipe with pipe ends and connecting ports as needed to fill and discharge the incoming fuels. The top of the main tank has an expansion column to allow light vapors to be removed from the collected liquids below. The second tank is a standard holding tank with inlet and outlet connections plus a coupling for level indication. The large tank is constructed to allow for high temperature fuel storage and collects from the first three cyclones. The smaller tank will see low temperature fuels and is used to collect fuel from the last cyclone and the coil condenser.

After the vapors leave the air cooled heat exchanger it enters into a chilled coil condenser. The coil condenser is located above the small fuel tank. The condenser consists of six 1 inch diameter stainless steel round tubes that have been rolled into a spiral. The spiral reduces the overall length of the 1 inch tubing to one tenth the length. The spiral shape also assists in the slowing of the incoming vapors by use of the turning static pressure. The coils are attached through a top and bottom flange plate. This assembly is inserted into a drum housing with matching flanges. The drum housing is filled with a glycol product that acts as the media for the heat exchange. The glycol remains resident inside this drum. A cooling coil is introduced into the drum which cools the glycol. In turn the glycol cools the 1 inch tubing that cools the vapors inside. The cooling coil is attached to a standard refrigeration system and remains closed loop through the glycol drum. The vapors passing through the 1 inch coils, cool, so the coil condenser allows the produced condensation to drip to the bottom in the collection chamber, exiting the device. The special flange connection at the bottom of the glycol drum allows for liquid to go in one direction and gas to go in another. The chamber between the glycol drum and the outside is where the remaining vapors travel. This zone also is cooled by the glycol thus it benefits from double cooling. The coil condenser is designed with bolted flange connections for access and service to all components of this equipment.

The chilled gases leave the coil condenser then travel through two bubbler tanks. These tanks have an extended pipe from the inlet port that is submerged under the liquid water line. This submerged pipe causes back pressure to the system by resistance of the liquid in the bubbler tank. This is referred to as water column pressure and by using two tanks the height can be divided between each one. An example is if total water column back pressure is 60 inches in one bubbler and 50 inches in the second bubbler, a total of 110 inches of water column back pressure is created. These bubbler tanks can contain different liquid components as needed to remove any contaminants in the remaining vapors. The first tank is designed to hold water and is equipped with a level indicator and a PH meter to monitor the condition of the water. Water is used to remove sulfur and the buildup of sulfur will be indicated by a change in the PH. The second bubbler contains caustic soda which will capture any chlorine gas in the vapors. This is also monitored with a PH meter and this second bubbler is also equipped with a level indicator and level sensor.

The last tank on the cyclone cooling system is a standard expansion tank that is designed to catch any liquid droplets that may travel through the piping. Pressure sensors and indicators mounted on this expansion tank keep track of the reactor pressure. Throughout the cyclone cooling system are differential pressure gauges. These gauges are used to identify any buildup or clog edge in the pipe or in any component of the cooling system. The entire process is mounted on a bolted steel frame system. The standard A36 carbon steel frame, painted and equipped with matching connection clips for all corresponding equipment. The size and shape of the equipment is designed for quick breakdown and transport in a standard sea container.

It should be noted and understood that while the above and other advantages and results of the present invention will become apparent to those skilled in the art from the following detailed description and accompanying drawings, showing the contemplated novel construction, combinations, and elements herein described, and more particularly defined by the appended claims, it should be clearly understood that changes in the precise embodiments of the herein described invention are meant to be included within the scope of the claims, except insofar as they may be precluded by the prior art.

BRIEF DESCRIPTION OF THE DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed herein connection with certain preferred embodiments, the description is not intended to limit the invention to the specific embodiments shown and described here, but rather the invention is intended to cover all alternative embodiments and modifications that fall within the spirit and scope of the invention as defined by claims included herein as well as any equivalents of the disclosed and claimed invention.

Figure 1:
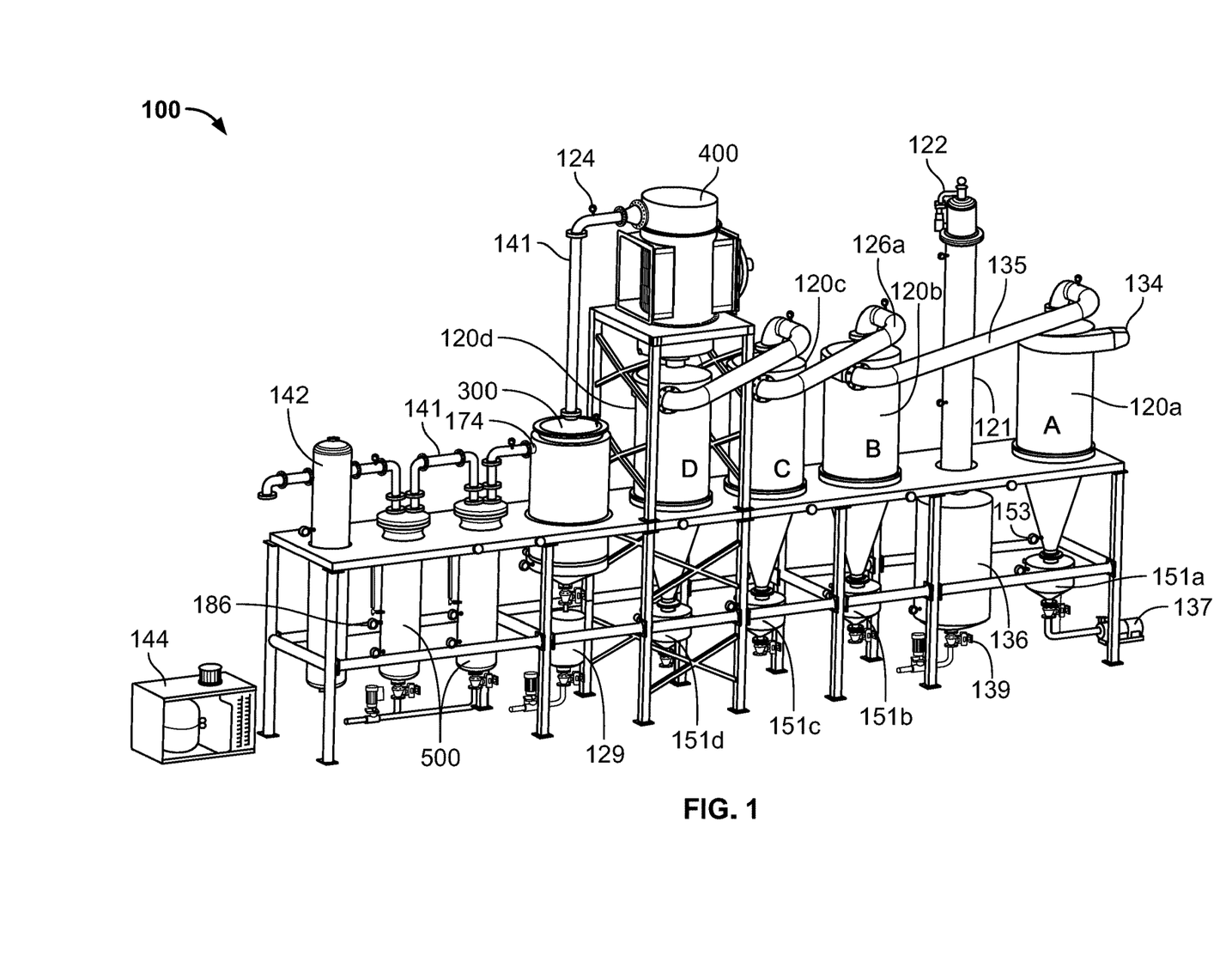
FIG. 1 depicts the section of the re-useable energy apparatus that is the Cyclone Cooling System.
Figure 2:
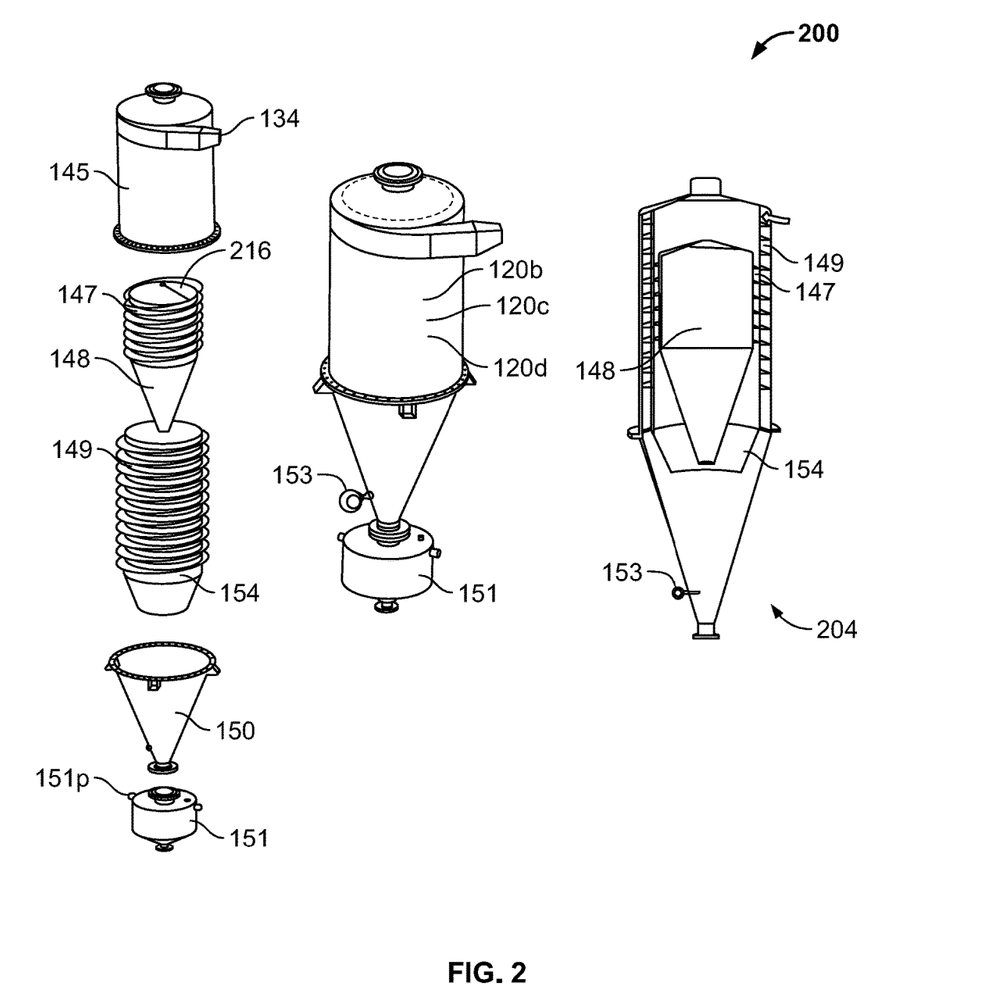
FIG. 2 depicts the Cyclone Cooler.
Figure 3:
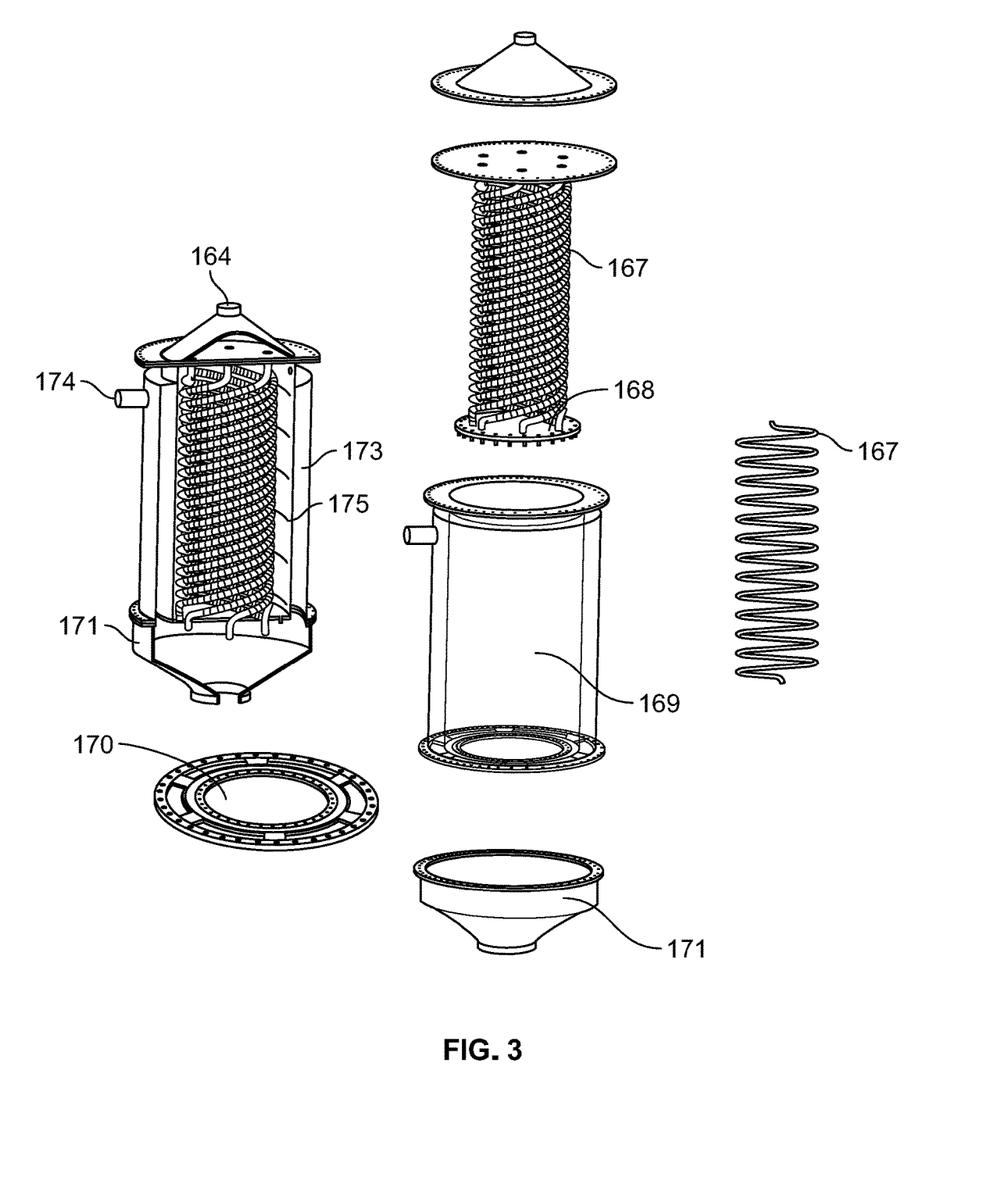
FIG. 3 depicts the Coil Condenser.
Figure 4:
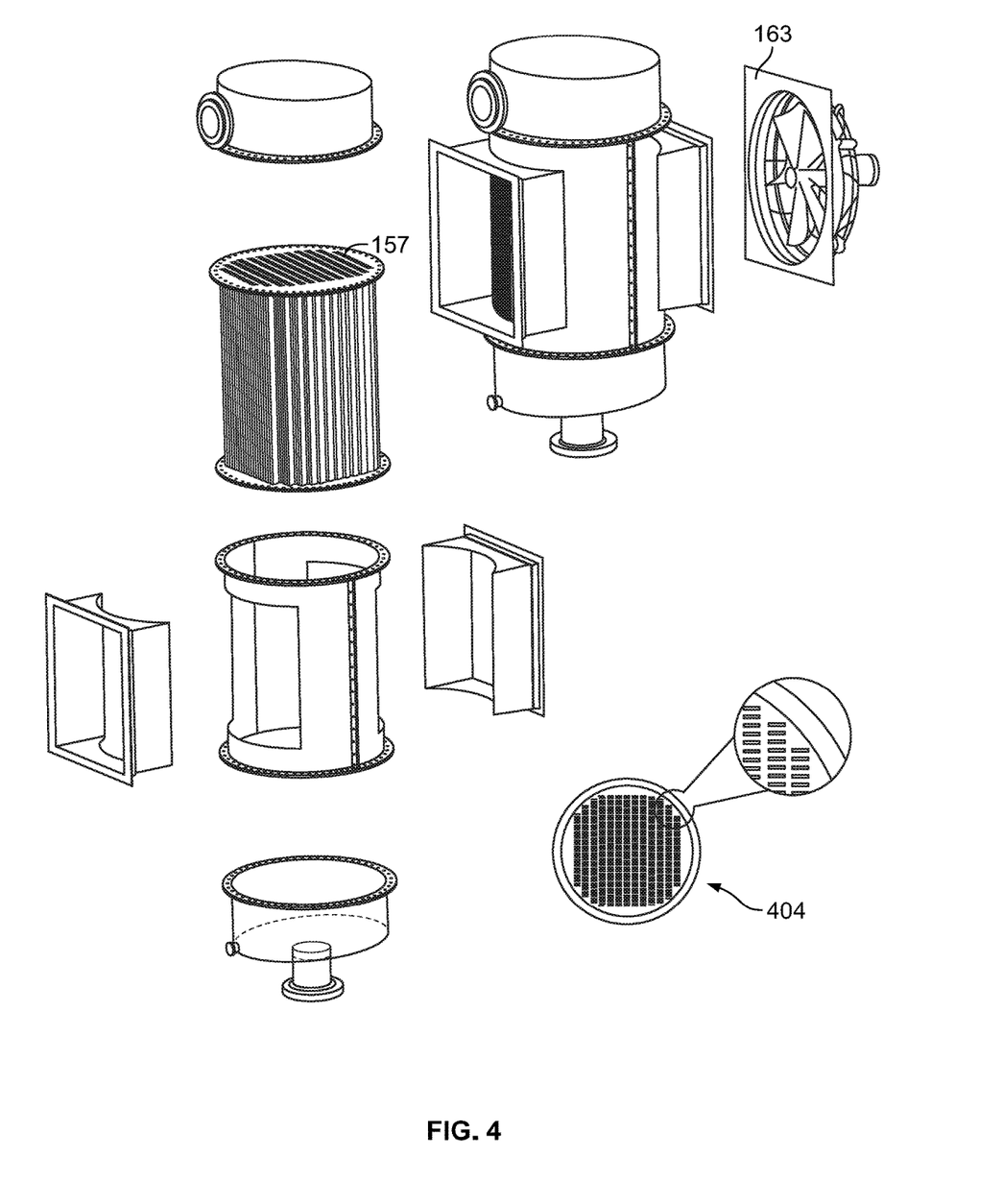
FIG. 4 depicts the Air Cooled Heat Exchanger.
Figure 5:
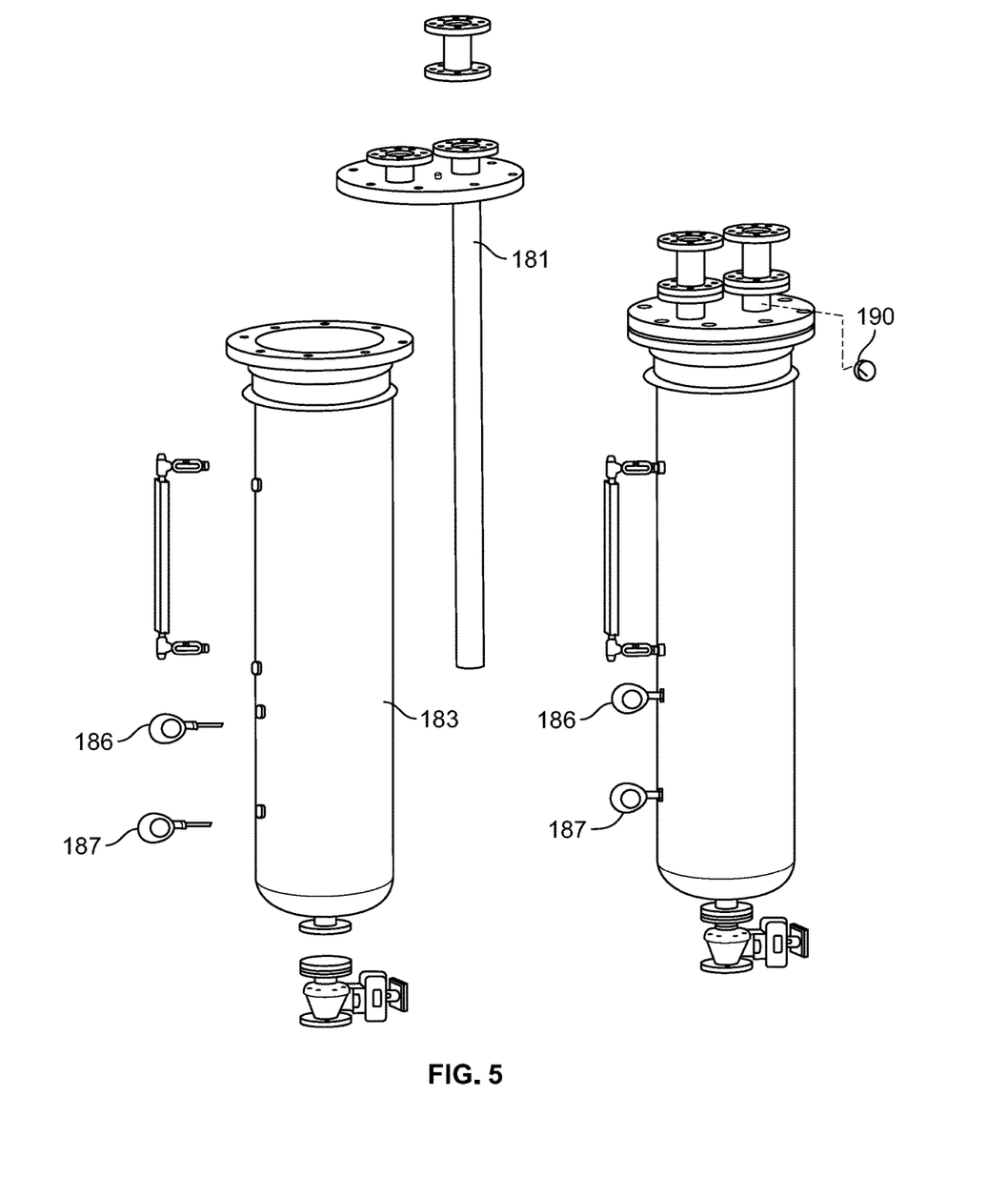
FIG. 5 depicts the Scrubber/Bubbler.
Figure 6:
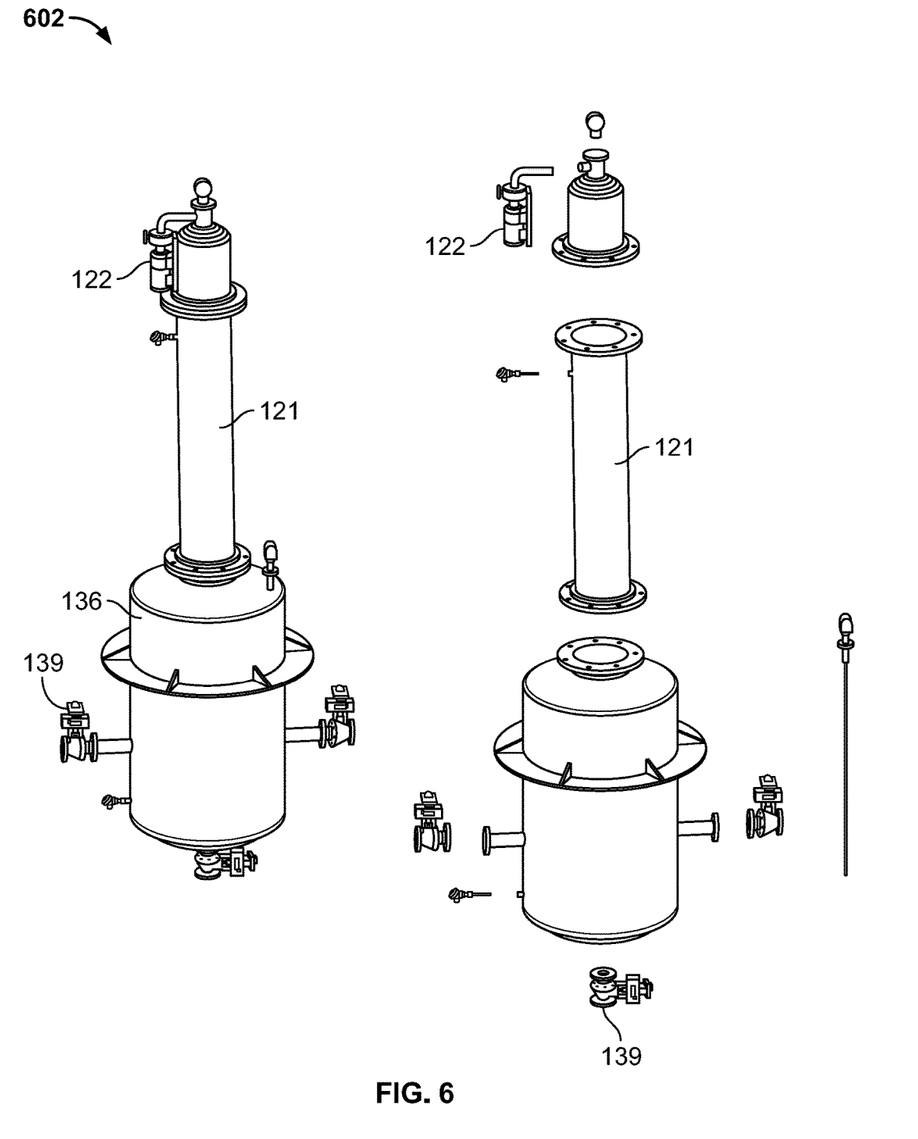
FIG. 6 depicts the Main Liquid Fuel Collection Tank.

The utility patent this application describes is a cooling system as depicted in FIG. 1 consisting of four cyclone coolers, three as shown in FIG. 2 and one that is merely standard cyclone FIG. 1 at 120a, a chiller as depicted in FIG. 3, an air heat exchanger as depicted in FIG. 4, two liquid bubblers/scrubbers as depicted in FIG. 5, a Main Liquid Fuel Collection Tank as depicted in FIG. 6, and an expansion tank as depicted in FIG. 1 at 142.

Plastic waste material is shredded and fed into a pyrolysis reactor. Applying heat above 350 degrees Celsius will cause the shredded plastic material to melt and vaporize. The up-stream reactor requires back pressure to assist in the thermal cracking of the carbon chains present in the plastic material. The Cyclonic Cooling System depicted in FIG. 1 produces the required back pressure due to static friction of the pipe and cyclones in addition to the water column pressure produced in the bubblers/scrubbers depicted in FIG. 5. Standard cyclones consist of an inlet section, body wall, cone to discharge and an internal tube. When the vapor or gas stream enters the cyclone it rotates around the body and down the cone, then up through the tube and out of the cyclone. The amount of rotation on the incoming gas, dictates the amount of rotation and centripetal force it produces and particles being conveyed with the gas. This force separates the particles from the gas and drops through the cone, then out of the cyclone. The gas rotates and drops down the cone, increasing in velocity and pressure due to the smaller and smaller diameter on the cone. This action packs the gas stream at the bottom of the cone and forces it to rise back up and through the internal tube, then out of the cyclone to the next cyclone. The rotations of the vapor within a standard cyclone are based on the velocity of the gas as it enters the cyclone. In the presented invention, the cyclone inlet is depicted in FIG. 1 at 134 and FIG. 2 at 134. This inlet FIG. 1 at 134 has a diameter of 6 inches and its inlet velocity can handle 3,234 feet per minute based upon the pyrolysis reactor's rate capability based upon the following values: 2,000 pounds of shredded plastic material processed per hour at 1,150 degrees Fahrenheit. As the pyrolysis reactor has a 7 percent char rate the remaining volume of shredded plastic processed after the char is removed is 1,860 pounds per hour processed into a gaseous state. The gas weighs 0.78 ounces per cubic foot. The first cyclone FIG. 1 at 120a is receiving gas at a rate of 635 cubic feet per minute. Ambient temperature is assumed to be 70 degrees Fahrenheit for purposes of exposure to heat loss.

Figure 7:
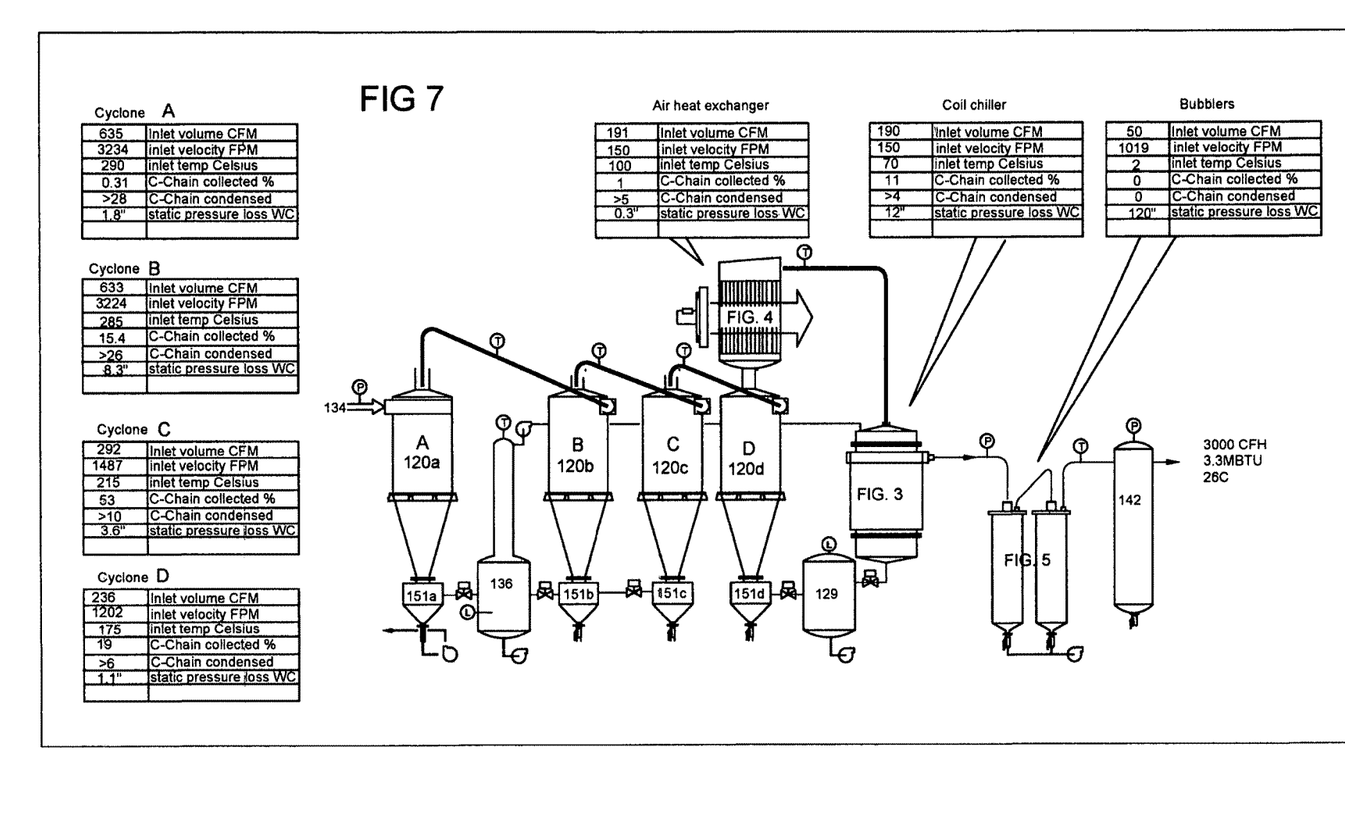
FIG. 7 depicts the process flow calculations.

The first cyclone FIG. 1 at 120a is a standard cyclone. The vapor remains in this cyclone FIG. 1 at 120a for 4 seconds. This allows for a heat loss of between 3 and 8 degrees Fahrenheit. The fuel collected at the bottom of this cyclone FIG. 1 at 151a contains carbon chains that are C-28 or larger. This first cyclone FIG. 1 at 120a also collects large char particles that may have travelled into the cyclonic cooling system. These char particles will drop out of the vapor stream and will be deposited to the discharge hopper at the bottom of the cyclone FIG. 1 at 151a where it mixes with fuel containing carbon chains that are C-28 and larger. This fuel char mixture may be returned and re-fed into the pyrolysis reactor for further thermo cracking via a high temperature pump FIG. 1 at 137. The vapors leaving this first standard cyclone FIG. 1 at 120a are traveling at a velocity of 3,224 feet per minute and will travel through a cross over pipe FIG. 1 at 135 for 2.9 seconds. Due to this pipe's FIG. 1 at 135 thin wall the heat loss of the vapor as the vapor travels through this pipe will be approximately 2 degrees Fahrenheit. This heat loss lowers the inlet vapor volume of the vapor entering the second cyclone FIG. 1 at 120*b*, FIG. 2. The second cyclone FIG. 1 at 120*b* is designed with 158 feet of turning fins FIG. 2 at 149. The distance between these turning fins FIG. 2 at 149 is 4 inches (the pitch) with the width of the flight being 3 inches. These fins have 12 spiral rotations with a 36 inch outside radius. There are also fins placed on the inner tube drum FIG. 2 at 147 with 6 spiral rotations with the same pitch and width as the fins at 149 in FIG. 2. This design has spiral fins FIG. 2 at 149 are attached inside the body FIG. 2 at 154 to force the amount of rotations. This makes the gases come into contact with body FIG. 2 at 145 a fixed amount of times before entering the cone FIG. 2 at 150 below. The travel time through the second cyclone FIG. 1 at 120*b* is 3.8 seconds based on the process rate of the reactor of 2000 pounds of shredded plastic per hour. There is heat loss in this cyclone due to the friction produced by the fins as the fins act as heat sinks. As vapors cool, they condense and lose volume; loss of volume reduces the velocity of gas reducing its velocity and creating more retaining time, assisting in further heat loss within the cyclones. FIG. 7 shows the remaining Cyclonic Cooling System calculated losses. The process involved in the third cyclone, FIG. 1 at 120*c* is identical to the second cyclone, FIGS. 1 and 120*b*, the third cyclone FIG. 1 at 120*c* being designed and constructed in the same manner as the second cyclone, FIG. 1 at 120*b*. The vapors leave the second cyclone FIG. 1 at 120*b* and travel to the third cyclone in a cross over pipe FIG. 1 at 126*a*. The cooling process continues reducing the volume of the vapor and reducing the velocity of the vapor. The fourth cyclone, FIG. 1 at 120*d* is designed and constructed identically to second FIG. 1 at 120*b* and the third FIGS. 1 and 120*c* cyclones. When the vapor leaves this cyclone it enters a forced air heat exchanger FIG. 4. The exchanger has a total cross sectional area of 1600 square inches inside the oval flatten tubes. This high surface area increases the reaction time and slows the velocity of the remaining gas stream to 150 feet per minute and reduces the heat dramatically from approximately 100 degrees Celsius to 70 degrees Celsius due to the ambient air temperature. This creates a large amount of condensation that is collected inside the oval flatten tubes FIG. 4 at 157 that drips back into the cyclone FIG. 1 at 120*d* located directly below. This returning liquid fuel in turn further cools the vapor leaving the third cyclone FIG. 1 at 120*c*. The vapor travels through the air cooled condenser FIG. 4 and is pushed into the chilled cooling coils FIG. 3 (Coil Condenser) via a pipe FIG. 1 at 141. The coil condenser is a cooler that is constructed with six internally coiled 1 inch tubes FIG. 3 at 167 that are submerged through a tank of chilled glycol FIG. 3 at 169. The six 1 inch diameter stainless steel round tubes are in the form of a spiral FIG. 3 at 167. The spiral reduces the overall length of the 1 inch tubing from sixty feet where it is contained in an apparatus that is five feet in height. The six coils are arranged evenly around each other in a circular pattern. This creates an even distribution of the flowing gases inside the coils. The spiral shape assists in the slowing of the incoming vapors by the use of turning static pressure. These coils are attached through a top and bottom flange plate FIG. 3 at 170. This assembly is inserted into a drum housing FIG. 1 at 169 with matching flanges FIGS. 1 at 168 and 169. The drum housing FIG. 1 at 169 is filled glycol product that acts as the media for the heat exchange. The glycol remains present inside this drum. A cooling coil is introduced into the drum which cools the glycol. In turn the glycol cools the 1 inch tubing that is carrying the vapors inside. The cooling coil is attached to a standard refrigeration system FIG. 1 at 144 and remains closed loop through the glycol drum FIG. 1 at 169. The vapors pass through the 1 inch coil FIG. 3 at 167, allowing condensation to drip into the collection chamber FIG. 3 at 171. The vapor that does not turn into condensation exits the Coil Condenser FIG. 3 at 174 after the vapor circles the glycol drum. The flange connection at the bottom of the glycol drum FIG. 3 at 170 allows the liquid to go in one direction and gas to go in another. The chamber between the glycol drum and the housing FIG. 3 at 173 is the location of where the vapors travel to the gas outlet FIG. 3 at 174. This zone also sees the glycol temperature on the outside of the glycol drum FIG. 1 at 169 to further cool the vapor. The condensed vapor that exits this Coil Condenser as a liquid is collected in a smaller tank FIG. 1 at 129 and pumped to storage.

The coil condenser is the design with bolted flange connections for access and service to all components of this equipment. Each cooling cyclone and the coil chiller has a tank or collection hopper below them FIGS. 1 at 151*a*, 151*b*, 151*c*, and 151*d*. In the case of the cyclones, the collection discharge hopper FIGS. 1 at 151*a*, 151*b*, 151*c*, and 151*d* has a drain port, level indicator FIG. 1 at 153 coupling connection and a fuel outlet port (spill over) FIG. 2 at 151*p*. The spillover FIG. 2 at 151*p* allows for the build-up of collected fuel to be discharged into a respected holding tank.

The first three cyclones FIGS. 1 at 120*a*, 120*b*, and 120*c* discharge in the main holding tank FIG. 1 at 136 and FIG. 6 via control ball valves FIG. 1 at 139. The fourth cyclone FIG. 1 at 120*d* discharges in a tank FIG. 1 at 129 that is located beneath the chilling coil FIG. 3. This tank FIG. 1 at 129 contain the lighter, cooler collected fuels. The main tank FIG. 1 at 136 collects the heavier heated fuels and is filled from the cyclones depicted on FIGS. 1 at 120*a*, 120*b*, and 120*c*. Although the first three cyclones FIGS. 1 at 120*a*, 120*b*, and 120*c* collect higher temperature fuels, some light fuel (like benzene) are collected. The lighter fuels will vaporize from the heat of the holding fuels inside the main tank FIG. 1 at 136 and drift up the tank column FIG. 1 at 121. A pump FIG. 1 at 122 located at the top of the expansion column FIG. 1 at 121 will pull these vapors from the main tank FIG. 1 at 136 before they can re-condense, and forces them into the coil condenser FIG. 3. This allows for the collection of fuel of higher quality in the main tank FIG. 1 at 136 by rising the flash point on the collected fuel.

The chilled gases leave the coil condenser then travels to two bubbler tanks FIG. 5 that are connected in sequence with a pipe connection FIG. 1 at 141. These tanks have an extended pipe from the inlet port that is submerged under the liquid water line FIG. 5 at 181. This submerged pipe FIG. 5 at 181 causes back pressure to the system by the resistance of the liquid in the bubbler tank. This is referred to as water column pressure. By using two tanks to achieve the water column pressure, the height can be divided. These bubbler tanks can contain different liquid components as needed to remove any contaminants in the remaining vapors. The first tank is designed to hold water and is equipped with a level indicator FIG. 5 at 186 and a PH meter FIG. 5 at 187 to monitor the condition of the water. Water is used to remove sulfur and the buildup of sulfur will indicate a change in the PH. The second bubbler contains caustic soda, this will capture any chlorine gas in the vapors. This tank also has a PH meter FIG. 5 at 187 and is also equipped with a level indicator FIG. 5 at 186 and level sensor.

The last tank on the cyclone cooling system is a standard expansion tank FIG. 1 at 142 but it is also designed to catch any liquid droplets that may travel through the Cyclonic Cooling System. Pressure sensors and indicators monitor the reactor pressure from this point in the system.

By forcing the rotations, the hot gases will lose heat from thereto contact loss with the outside body FIG. 2 at 145 wall. The gases pack at the bottom like a standard cyclone but are forced to reverse rotation before entering the internal tube. This adds to the particle separation, because the gases come to a complete stop before reversing direction, allowing the particles to fall out of the gas stream. The design then uses the cyclone as a separator and a cooler/condenser. As hot gases lose heat, condensation is collected in the cooler area. By controlling the gas resident time inside the cyclone, a fixed condensing temperature can be achieved. By controlling this temperature, fuel can be distilled into c-chain groups between a group of cyclones. This design has four cyclones in series FIGS. 1 at 120a, 120b, 120c, and 120d. The first cyclone collects the larger particles and higher carbon chain fuels only. The next three cyclones separate the fuel grades based on condensing temperatures. Separated fuels have temperatures which cause vaporization of the fuels to ignite when exposed to an open flame. This process is referred to as a flash point. The lower the carbon chain number in the fuel, the lower the temperature of the liquid fuel, that will cause the fuel to ignite. This temperature will be referred to as the "yield flash indicator" (YFI). In order to increase the YFI, the removal of the lighter carbon chains by use of heat is required.

Each cyclone collects vapor at a lower temperature than the one before it in the gas stream creating its own YFI value. Inside the internal tube FIG. 2 at 154 is a reversed set of fins FIG. 2 at 147 connected to a filler drum FIG. 2 at 148 inside the tube. The discharge of each cyclone has a hopper, or discharge tank, FIG. 2 at 151 to store condensed fuels. Each hopper can be directed to a holding tank by selected ball valves. A level indicator FIG. 2 at 153 is used to start the discharge of the collected fuels. The collection hopper also has a drain valve FIG. 1 at 139 for cleanout use. The last cyclone, the fourth, in the series FIG. 1 at 120d will have an air contact heat exchanger FIG. 4 to insure full ambient cooling. This heat exchanger FIG. 4 condenses the last of the ambient temperature fuels and drips it back through the cyclone, acting as a reflux and cooling for the cyclone. The remaining vapors then pass through a coil type chiller FIG. 3 via a connecting pipe FIG. 1 at 141. This is a set of five coils FIG. 3 at 167 averaging 65 feet in straight length each and wrapped around each other in an even spacing. The coils FIG. 3 at 167 are set inside a tube FIG. 3 at 169 filled with glycol for chilling. This glycol is chilled with refrigerated coils FIG. 3 at 175 from an air conditioner compressor and controlled to maintain the set point temperature. The incoming vapors entering the coil condenser at FIG. 3 at 164 will condense and drip out of the chiller housing FIG. 3 at 171. The vapors then turn up from the bottom of the coils and travel to the gas outlet FIG. 3 at 174. On the way to this outlet port, the gases are again exposed to the cold wall FIG. 3 at 173 of the glycol chamber FIG. 3 at 169. This creates a 100% use of the chilling chamber. The remaining gases are considered non-condensable at room temperature. This gas is referred to as syn-gas.

The syn-gas is then passed through two sets or bubbler/scrubbers FIG. 5. The first is filled to a fixed point with water. This water acts as a back pressure device, a flame arrester device and a scrubber. Along with the C4, hydrogen and other gases that make up the syn-gas, some unwanted gases also travel with the syn-gas from time to time. Without good control of the plastics entering in the reactor, chorine and sulfur can be introduced. The first bubbler will catch the sulfur in the water producing a weak dibasic acid, $SO_2 + H_2O = H_2SO_3$.

The next bubbler also acts as a back pressure device, flame arrester and scrubber. This time it is filled with caustic soda to scrub chorine. $Cl + NaOH = NaClO$ or salt and water. The bubblers FIG. 5 are also equipped with a level control 186 so the level of the bubbling liquids is monitored as well as a PH meter FIG. 5 at 187 to indicate the condensing on the bubbling/scrubbing liquids.

At this point the syn-gas is ready to be used. The burners for the reactor use this fuel. The syn-gas may also be used to power a generator that could power the reactor's electrical system. The last item in the cooling system is a finish tank. This tanks act a drip collection if any liquids travel past the bubblers. It also serves as an expansion tank for the syn-gas. When the pressure inside this tank is at set point, the gas is allowed to be used.

What is claimed is:

1. An apparatus that is part of a reusable fuel processing unit, the apparatus being used to cool the vapors produced by a pyrolysis reactor comprising;

four cyclone coolers, two fuel tanks, an air cooled radiator, one glycol chilled coil condenser, two bubblers, and one expansion tank all attached to a structural frame where;

the cyclone coolers are connected to each other in a daisy chain configuration where;

the cyclones are connected in a daisy chain configuration by a cross over pipe where;

the vapor that is condensed in the first cyclone of the four cyclone coolers drops out of the first cyclone into a discharge hopper and the vapor that is not condensed in the first cyclone enters the cross over pipe where;

the cross over pipe that the vapor enters is connected to a second cyclone of the four cyclone coolers where;

the vapor that is condensed in the second cyclone is discharged into a main holding tank of the two fuel tanks and the vapor that is not condensed in the second cyclone enters the cross over pipe where;

the cross over pipe that the vapor enters is connected to a third cyclone of the four cyclone coolers where;

the vapor that is condensed in the third cyclone is discharged into the main holding tank and the vapor that is not condensed in the third cyclone enters the cross over pipe where;

the cross over pipe that the vapor enters is connected to a fourth cyclone of the four cyclone coolers where;

the vapor that is condensed in the fourth cyclone is discharged into a second holding tank of the two fuel tanks and the vapor that is not condensed enters the air cooled radiator where;

the vapor that is condensed enters back into the fourth cyclone and is discharged into the second holding tank and the vapor that is not condensed enters into the glycol chilled coil condenser where;

the vapor that is condensed enters into the second holding tank, the vapor that is not condensed enters into the bubblers, and any liquid droplets enter into the expansion tank.

2. The apparatus of claim 1, wherein the second, third and fourth cyclones connected in a daisy chain where;

the first, second and third cyclones are configured in a daisy chain where;

all four cyclones consist of a scrolled inlet, flanged body section, internal tube with fixed rotation fins, an interior baffle with reversed rotation fins, a bolted cone with support pads, and a discharge hopper with an outlet port where;

the fixed rotation fins are attached to the internal tube allowing for the condensed liquid to run through the fixed fins to the discharge hopper where;

the internal tube includes a cone bottom configured to continue pressurizing vapor inside the cyclone wherein within the internal tube, a cone drum is configured to act as a baffle where;

the baffle has rotation fins on one side where;

the baffle has a sloped top to allow for drainage of any condensation that may occur inside where;

a gas inlet and an outlet discharge ports have a flange connection where;

the cone bottom is equipped with a coupling that acts as a level indicator where;

the cone bottom has a discharge part for connection to the discharge hopper where;

the discharge hopper has a drain port where;

the fourth cyclone in the daisy-chain has the air cooled radiator connected to a top discharge flange.

3. The apparatus of claim 1, wherein the structural frame comprises a structural steel frame.

4. The apparatus of claim 2, wherein the first three cyclones are constructed of 10 gauge stainless steel.

* * * * *